Patented Mar. 3, 1942

2,275,289

UNITED STATES PATENT OFFICE 2,275,289

COATED MATERIAL AND METHOD OF PRODUCING SAME

Emil Czapek, Berlin, Germany, assignor to Guaranty Trust Company of New York, New York, N. Y., a banking corporation of New York No Drawing. Application May 13, 1938, Serial No. 207,811. In Germany January 11, 1937

19 Claims. (Cl. 91—68)

This invention relates to an improved film or sheet material as a new article of manufacture and the process of making such new film, which is perfectly clear and transparent, extremely firm, not brittle, but flexible and is not explosive and not or only with great difficulty combustible. The new film is also distinguished by its very hard surface which is resistant to mechanical injuries, such as scratches.

A feature of the invention resides therein that several, at least three different pellicles or coatings, each exceptionally thin and of various combinations and of various qualities are so combined with each other that they form one uniform film or sheet material and that the individual coatings or layers so combined cannot separate easily from each other.

It has been found, that a thin pellicle or membrane of cellulose hydrate can be used as a base for such films. Such a pellicle has a high tear and crease resistance. This pellicle is covered with a layer, consisting of chlorinated paraffin and chlorinated rubber. The mixing proportion between these two should preferably be at least fifty per cent and preferably seventy per cent of chlorinated paraffin to less than fifty per cent and preferably thirty per cent of chlorinated rubber.

In order properly to apply the coating, the ingredients of the same in the process of manufacture are dissolved in a suitable solvent or mixture of solvents, to which perhaps some resin in small quantities may be added. This coating renders the film extremely pliable and protects it against atmospheric changes and the like.

This pliable film layer or coating is now furthermore protected against external influences with a second coating or layer comprising a cellulose ester such as nitro-cellulose or acetylcellulose, to which softeners and resins may be added. As solvents, those liquids are selected which readily dissolve the above mentioned components but cannot dissolve the first coating comprising chlorinated paraffin and chlorinated rubber. However, it is advantageous to add to the cellulose ester solution a small amount of a solvent or solvents in which chlorinated rubber is soluble, the amount determined being just sufficient so that where the opposing faces of the first coating with the ester solution meet, the former will be so affected that it will combine itself with the latter while being applied, as an instance, by a partial diffusion or infusion, better expressed as an interaction of molecules as distinguished from a chemical reaction.

The applying and drying of the coatings are effected as hereinafter to be described by means of suitable coating machines or by dipping of the supporting base and scraping off the excess liquid in the well known manner.

Films manufactured in this way demonstrate the advantages supplied by its ingredients in that the characteristics to a certain extent supplement one another. As an instance, from a physical point of view, such films are just as durable and pliable as films composed of cellulose hydrate and in addition they are also as resistant and unchangeable against external influences as all ester films. In addition, the desirable characteristics of the chlorinated paraffin and chlorinated rubber coating are retained and active while the undesirable characteristics are repressed or at least fail to express themselves since this coating is embedded and enclosed by the other layers.

These supplemental advantages express themselves particularly from an optical point of view. As an instance, whereas all wax-containing coatings or layers, that is those composed of nitrocellulose, resin and wax are not as hard as those without wax, and thus can be easily scratched or surface marked, films made according to the present process have a hard, scratch resisting outer surface and a pliable inner structure. These films are therefore in little danger of being surface marked or scratched. Furthermore, wax containing coatings or layers formed on an ester base are optically not free from objection because the wax is not dissolved therein but maintained in suspension. On the other hand, the chlorinated paraffin and chlorinated rubber material presents a coating that is free from objection and which continues clear after it has been combined and connected with the cellulose hydrate layer and the ester coating.

The advantage here made possible of separate coatings having a wax free surface is felt in many fields of endeavor. With the help of the intermediary layer of chlorinated paraffin, these films can be made moisture-proof to a high degree. Since the outer layer does not contain any wax, the amount of paraffin in the inner layer can be maintained very high without running the risk that the wax may penetrate to the surface with the resulting objection that the foil becomes sticky, smeary and the like. A further advantage of the chlorinated rubber is that it combines the outer layer with the cellulose base and prevents removal by peeling.

For some purposes, as an instance, reproduction work, it is desired that such films do not have an outer layer or coating that is immune to water and oil but on the other hand may require that such outer layer or surface is receptive to water or oil containing substances such as paints, inks, adhesives and the like which however will not pass or not permeate through the film. Films suitable for such purposes can also be obtained if the position of the layers is reversed, as for instance, if the ester layer is located on the inside with the chlorinated paraffin-rubber layer on one or both sides and the cellulose hydrate layer upon the outer side of the chlorinated paraffin-rubber layer.

Excellent results have been obtained when the ingredients and proportions selected for the chlorinated paraffin correspond to the following table in which four examples are listed, the ingredients and proportions of the examples listed in columns designated $a$, $b$, $c$ and $d$ corresponding to the examples $a$, $b$, $c$ and $d$, to wit:

|  | a | b | c | d |
|---|---|---|---|---|
|  | Parts by weight | Parts by weight | Parts by weight | Parts by weight |
| Chlorinated rubber | 15 | 8 | 10 | 12 |
| Chlorinated paraffin | 20 | 25 | 15 | 17 |
| Toluol |  |  | 30 | 20 |
| Xylol | 65 | 30 | 40 |  |
| Benzin |  | 7 | 20 | 30 |
| Butanol |  |  | 15 | 20 |
| Resins |  |  |  | 3 |

Similarly excellent results have been obtained when the ingredients and proportions selected for the ester layer correspond to the following table in which also four examples are listed, the ingredients and proportions of the examples listed in columns $a$, $b$, $c$ and $d$ corresponding to the examples $a$, $b$, $c$ and $d$, to wit:

|  | a | b | c | d |
|---|---|---|---|---|
|  | Parts by weight | Parts by weight | Parts by weight | Parts by weight |
| Cellulose ester | 8 | 12 | 16 | 20 |
| Softeners such as palatinol | 6 | 8 | 12 | 20 |
| Solvents such as butanol | 50 | 50 | 45 | 44 |
| Diluting medium, such as benzol | 24 | 18 | 11 |  |
| Resins | 2 | 4 | 10 |  |
| Paraffin or wax |  |  |  | 0.5 |
| Solvents for chlorinated rubber (xylol) | 10 | 8 | 6 | 15.5 |

The applying of the coatings may be effected by means of suitable machines with which a solution of the intermediary layer is first applied upon the cellulose foil in a uniform manner. By means of evaporation of the solvents, the intermediary layer is then dried so far that the other coating may be effectively applied. The pouring or applying of the outer coating is effected in a manner similar to that for applying or pouring the intermediate layer; and this application may be effected separately on either side of the base or simultaneously on both sides. Thereupon the solvents will be evaporated and the film will be dried. This drying process will continue until it is certain that only a small unavoidable quantity of solvents remains in the film.

I claim:

1. A transparent flexible crease-resisting and odorless article of manufacture comprising a sheet of cellulose hydrate coated with a plurality of layers, one layer comprising a main amount of chlorinated paraffin, a lesser amount of chlorinated rubber and a still lesser amount of resin, said layers bonded to one another forming an article of which at least one layer is tear resisting and waterproof.

2. A transparent flexible crease-resisting and odorless article of manufacture comprising a sheet of cellulose hydrate as a base, coated with a plurality of layers of different compositions, one composition consisting of chlorinated rubber and chlorinated paraffin, and the other composition selected from the group consisting of cellulose esters, said layers bonded to one another and in turn forming a substantially uniform sheet.

3. A transparent article of manufacture consisting of a cellulose hydrate layer, combined with an intermediate moistureproofing composition containing mainly chlorinated paraffin with an addition of chlorinated rubber, and with an outer coating layer containing a cellulose ester as the base.

4. A transparent article of manufacture consisting of a cellulose hydrate layer, an intermediate coating consisting of a moistureproofing composition containing mainly chlorinated paraffin with an addition of chlorinated rubber, and an outer surface coating containing a cellulose ester as the base.

5. The process of manufacturing a transparent, flexible film consisting in coating a cellulose hydrate layer with an intermediate layer having non-volatile constituents comprising a main amount of chlorinated paraffin, a lesser amount of chlorinated rubber and a still lesser amount of a resin, and thereupon coating the intermediate layer with an outer coating containing a cellulose ester as the base.

6. The process of manufacturing a transparent, flexible film consisting in coating a cellulose hydrate layer with an intermediate layer having non-volatile constituents consisting mainly of chlorinated paraffin and partly of chlorinated rubber, and thereupon coating the intermediate layer with an outer coating containing a cellulose ester as the base.

7. The process of manufacturing a transparent, flexible film consisting in coating a cellulose hydrate layer with an intermediate layer having non-volatile constituents comprising a main amount of chlorinated paraffin, a lesser amount of chlorinated rubber and a still lesser amount of a resin, and thereupon coating the intermediate layer with an outer coating containing a cellulose ester as the base, plasticizers and a wax.

8. The process of manufacturing a transparent, flexible film consisting in coating a cellulose hydrate layer with an intermediate layer having non-volatile constituents comprising a main amount of chlorinated paraffin, a lesser amount of chlorinated rubber and a still lesser amount of a resin and a wax, and thereupon coating the intermediate layer with an outer coating containing a cellulose ester as the base.

9. The process of manufacturing a transparent, flexible film consisting in coating a cellulose hydrate layer with an intermediate coating comprising a main amount of chlorinated paraffin, a lesser amount of chlorinated rubber and a still lesser amount of a resin and a wax, dissolved in volatile solvents, drying the same, thereupon coating the intermediate layer so formed with an outer coating containing a cellulose ester, softeners and a wax, and solvents for the ester, chlorinated rubber and wax, and drying the same.

10. The process of manufacturing a transparent, flexible film consisting in coating a cellulose hydrate layer with an intermediate layer having non-volatile constituents consisting mainly of chlorinated paraffin and partly of chlorinated rubber, resins and softeners, and thereupon coating the intermediate layer with an outer coating containing a cellulose ester as the base.

11. The process of manufacturing a transparent, flexible film consisting in coating a cellulose hydrate layer with an intermediate layer having non-volatile constituents comprising a main amount of chlorinated paraffin, a lesser amount of chlorinated rubber, and a still lesser amount of a resin and a wax, and thereupon coating the intermediate layer with an outer coating containing a cellulose ester as the base, a resin and softeners.

12. The process of manufacturing a transparent, flexible film consisting in coating a cellulose hydrate layer with an intermediate layer having non-volatile constituents consisting mainly of chlorinated paraffin and partly of chlorinated rubber, resins and softeners, and thereupon coating the intermediate layer with an outer coating containing a cellulose ester as the base and resins and softeners.

13. The process of manufacturing a transparent, flexible film consisting in coating a cellulose hydrate layer with an intermediate coating consisting mainly of chlorinated paraffin and volatile solvents, and partly of chlorinated rubber, drying the same, thereupon coating the intermediate layer so formed with an outer coating containing a cellulose ester, solvents for the ester, softeners and solvents for the chlorinated rubber, and drying the same.

14. The process of manufacturing a transparent, flexible film consisting in coating a cellulose hydrate layer with an intermediate coating comprising a main amount of chlorinated paraffin, a lesser amount of chlorinated rubber and a still lesser amount of a resin, all dissolved in volatile solvents, drying the same, thereupon coating the intermediate layer so formed with an outer coating containing a cellulose ester, softeners, solvents for the ester and the resin, and drying the same.

15. The process of manufacturing a transparent, flexible film consisting in coating a cellulose hydrate layer with an intermediate coating comprising a main amount of chlorinated paraffin, a lesser amount of chlorinated rubber and a still lesser amount of a resin and a wax, all dissolved in volatile solvents, drying the same, thereupon coating the intermediate layer so formed with an outer coating containing a cellulose ester, softeners and a wax, and solvents for the ester, chlorinated rubber and wax, and drying the same.

16. The process of manufacturing a transparent, flexible film consisting in coating a cellulose hydrate layer with an intermediate coating comprising a main amount of chlorinated paraffin, a lesser amount of chlorinated rubber and a still lesser amount of a resin and a wax, all dissolved in volatile solvents, drying the same, thereupon coating the intermediate layer so formed with an outer coating containing a cellulose ester, softeners, and a wax, and solvents for the ester, chlorinated rubber and wax, and drying the same.

17. The process of manufacturing a transparent, flexible film consisting in coating a cellulose hydrate layer with an intermediate coating consisting mainly of chlorinated paraffin and volatile solvents, and partly of chlorinated rubber, resins and waxes, drying the same, thereupon coating the intermediate layer so formed with an outer coating containing a cellulose ester, solvents for the ester, softeners and resins and solvents for the chlorinated rubber or waxes, and drying the same.

18. A transparent flexible crease-resisting and odorless article of manufacture comprising a sheet of cellulose hydrate combined with an intermediate moistureproofing layer comprising a main amount of chlorinated paraffin, a lesser amount of chlorinated rubber and a still lesser amount of resin, with a scratch resisting and non-sticky outer coating layer comprising a celluester as a base and lesser amounts of resin and plasticizers.

19. A transparent flexible crease-resisting and odorless article of manufacture comprising a sheet of cellulose hydrate combined with an intermediate moistureproofing layer comprising a main amount of chlorinated paraffin, a lesser amount of chlorinated rubber and a still lesser amount of resin, and with an outer coating layer comprising a cellulose ester as a base, a lesser amount of resin and a still lesser amount of a wax.

EMIL CZAPEK.